(12) United States Patent
Bardy

(10) Patent No.: US 9,300,169 B1
(45) Date of Patent: Mar. 29, 2016

(54) AUTOMOTIVE ROOF RACK WITH INTEGRAL SOLAR CELL ARRAY

(71) Applicant: Cameron M. D. Bardy, Carnation, WA (US)

(72) Inventor: Cameron M. D. Bardy, Carnation, WA (US)

( * ) Notice: Subject to any disclaimer, the term of this patent is extended or adjusted under 35 U.S.C. 154(b) by 175 days.

(21) Appl. No.: 13/928,297

(22) Filed: Jun. 26, 2013

(51) Int. Cl.
- *H02J 7/00* (2006.01)
- *H02J 7/35* (2006.01)
- *H02J 7/02* (2006.01)

(52) U.S. Cl.
CPC .. *H02J 7/35* (2013.01); *H02J 7/025* (2013.01)

(58) Field of Classification Search
CPC ............ H01L 31/02008; H01L 31/0547; Y02E 10/47; Y02E 10/50; Y02B 10/12; H02J 3/383; H02J 7/35
USPC ......................................................... 320/101
See application file for complete search history.

(56) References Cited

U.S. PATENT DOCUMENTS

| | | | |
|---|---|---|---|
| 3,976,508 A | 8/1976 | Mlavsky | |
| 3,990,914 A | 11/1976 | Weinstein et al. | |
| 4,052,782 A | 10/1977 | Weinstein et al. | |
| 4,078,944 A | 3/1978 | Mlavsky | |
| RE29,833 E | 11/1978 | Mlavsky | |
| 7,185,694 B2 | 3/2007 | Dunn et al. | |
| 7,196,262 B2 | 3/2007 | Gronet | |
| 7,235,736 B1 | 6/2007 | Buller et al. | |
| 7,259,322 B2 | 8/2007 | Gronet | |
| 7,281,758 B2 | 10/2007 | Fuchs et al. | |
| 7,394,016 B2 | 7/2008 | Gronet | |
| RE41,597 E | 8/2010 | Kirkpatrick | |
| 7,884,569 B2 | 2/2011 | Ward | |
| 7,997,322 B2 | 8/2011 | Knauer | |
| 8,746,620 B1 * | 6/2014 | Moussouris et al. | 244/123.11 |
| 2006/0283498 A1 | 12/2006 | Gronet | |
| 2007/0028958 A1 | 2/2007 | Retti | |
| 2007/0079864 A1 | 4/2007 | Gronet | |
| 2007/0157964 A1 | 7/2007 | Gronet | |
| 2007/0181176 A1 | 8/2007 | Gronet | |
| 2007/0215195 A1 | 9/2007 | Buller et al. | |
| 2007/0215197 A1 | 9/2007 | Buller et al. | |
| 2007/0240760 A1 | 10/2007 | Gronet | |
| 2008/0041439 A1 | 2/2008 | Achutharaman et al. | |
| 2008/0083449 A1 | 4/2008 | Cumpston | |
| 2008/0156285 A1 | 7/2008 | King | |
| 2008/0302415 A1 | 12/2008 | Buller et al. | |
| 2008/0302418 A1 | 12/2008 | Buller et al. | |
| 2009/0014055 A1 | 1/2009 | Beck et al. | |
| 2009/0078306 A1 | 3/2009 | Nagengast et al. | |
| 2009/0101632 A1 | 4/2009 | Naylor | |
| 2009/0211621 A1 | 8/2009 | LeBlanc | |
| 2009/0255471 A1 | 10/2009 | Morad | |
| 2009/0272422 A1 | 11/2009 | Li | |
| 2009/0320902 A1 * | 12/2009 | Hu et al. | 136/246 |
| 2010/0006140 A1 * | 1/2010 | Parker et al. | 136/246 |
| 2010/0065104 A1 * | 3/2010 | Baruh | 136/251 |
| 2010/0081289 A1 | 4/2010 | Marohl et al. | |

(Continued)

*Primary Examiner* — Suchin Parihar
(74) *Attorney, Agent, or Firm* — Patrick J. S. Inouye; Leonid Kisselev

(57) ABSTRACT

A solar power assembly is provided. The assembly includes means for nonplanar generation of solar power, wherein the solar power comprises sunlight converted into electrical energy; means for transmission of the solar power to a means for storage of electrical energy in a vehicle; and means for attachment of the means for nonplanar generation of solar power to a sunlight-exposed surface the vehicle. The assembly is capable of capturing sunlight from multiple angles and producing solar power for the vehicle's use.

11 Claims, 1 Drawing Sheet

(56) References Cited

U.S. PATENT DOCUMENTS

| | | |
|---|---|---|
| 2010/0084208 A1* | 4/2010 | Chen et al. ............... 180/65.31 |
| 2010/0212719 A1* | 8/2010 | Stolum ........................ 136/246 |
| 2010/0307447 A1 | 12/2010 | Sposato |
| 2011/0000534 A1 | 1/2011 | Buller et al. |
| 2011/0000601 A1 | 1/2011 | Cumpston |
| 2011/0045674 A1 | 2/2011 | Morad |
| 2011/0049992 A1 | 3/2011 | Sant' Anselmo et al. |
| 2011/0209746 A1 | 9/2011 | Zhang et al. |
| 2011/0214667 A1* | 9/2011 | Baruh ........................ 126/625 |
| 2012/0118367 A1* | 5/2012 | Song et al. .................... 136/256 |
| 2012/0317900 A1* | 12/2012 | Den Boer et al. ........... 52/173.3 |
| 2013/0000994 A1* | 1/2013 | Zhu .............................. 180/2.2 |
| 2013/0076078 A1* | 3/2013 | Ramdeo ................... 296/216.01 |
| 2014/0029105 A1* | 1/2014 | Fay ............................. 359/622 |
| 2014/0090687 A1* | 4/2014 | Den Boer et al. ............. 136/246 |
| 2014/0203139 A1* | 7/2014 | Moussouris et al. ........ 244/1 TD |

* cited by examiner

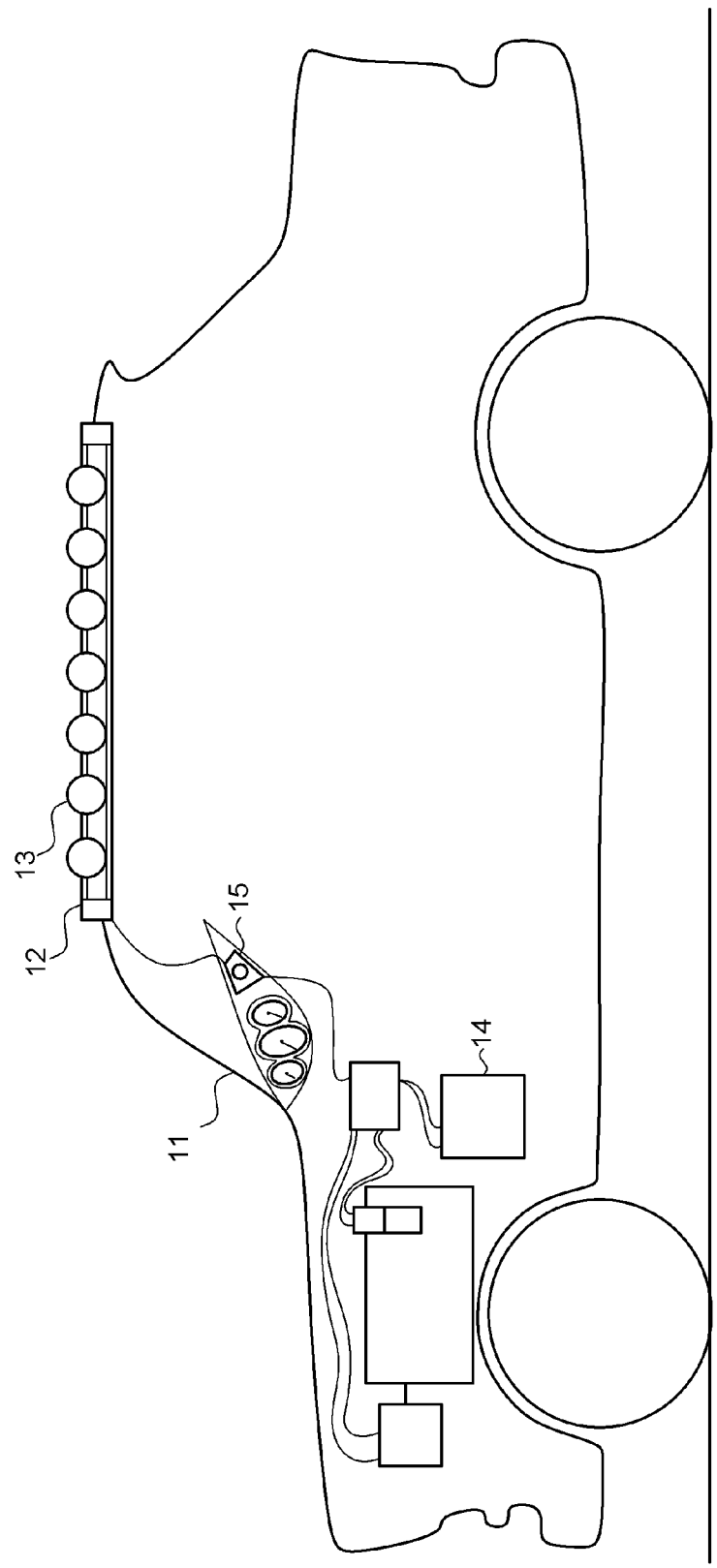

AUTOMOTIVE ROOF RACK WITH
INTEGRAL SOLAR CELL ARRAY

FIELD

The present invention relates in general to solar cell arrays, and in particular, to an automotive rack with an integral solar cell array.

BACKGROUND

A vehicle battery provides electrical energy to a wide range of onboard systems, including lights, ignition, and environmental controls, plus devices that are plugged in by the driver or passenger, such as GPS, mobile phone, and the like. In an electric or a hybrid electric vehicle, a battery, or more commonly a battery pack, also powers an electric motor that propels the vehicle, either solely or in conjunction with a gas engine. Adverse weather conditions accelerate the drain on the battery. This drain can result in a dead battery and a non-functional vehicle.

Conventional solutions to preventing the excessive battery drain are inadequate. An onboard alternator recharges a vehicle battery once the vehicle is in motion, but is useless if the battery is fully depleted and unable to start the vehicle. An external battery charger, typically plugged into an electrical wall outlet, can recharge a dead battery, yet requires the vehicle to remain stationary for an extended period of time while the vehicle charges. Jumper cables will allow one vehicle to provide sufficient power to a vehicle with a dead battery, but not every driver carries jumper cables.

One approach to preventing a battery from becoming too drained and non-functional is to supplement the battery's energy with solar power, that is, energy of sunlight converted into electrical energy. Arrays of solar cells, also known as panels, have been used to supplement the energy of vehicles' batteries with solar power. For example, U.S. Pat. No. 7,884,569, issued Feb. 8, 2011, to Ward, the disclosure of which is incorporated by reference, describes using a flat-surfaced solar panel to charge a battery pack of a hybrid electric vehicle. A solar panel is mounted outside the vehicle and electrical energy generated by the panel is fed through recharging circuitry into the battery pack to supplement regenerative power supplied by the hybrid drivetrain. The angle of the panel may be adjusted to direct the panel towards the sun. Notwithstanding, the constant movement of the vehicle renders the rate at which the adjustment would have to be performed to optimize the panel's output to be impracticable, particularly as the solar power that the panel generates must be spent on adjusting the position of the panel and consequently subtracted from the efficiency of the system.

Therefore, there is a need for a high-output and highly efficient solar power system for supplementing the energy of a vehicle's battery.

SUMMARY

A solar power assembly is disclosed. The assembly includes means for nonplanar generation of solar power, wherein the solar power includes sunlight converted into electrical energy. The assembly also includes means for transmission of the solar power from the nonplanar solar power generation means to means for storage of electrical energy in a vehicle and means for attachment of the nonplanar solar power generation means to a sunlight-exposed surface of the vehicle. In one embodiment, the sunlight-exposed surface of the vehicle can be the vehicle's roof. In a further embodiment, the assembly includes means for planar generation of solar power electrically connected with the nonplanar solar power generation means into an array. In a still further embodiment, the assembly can further include at least one of means for control of the nonplanar solar power generation means, means for movement of the nonplanar solar power generation means, and means for reflection of light at the nonplanar solar power generation means. In a still further embodiment, the nonplanar solar power generation means can be a cylindrical solar cell.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

BRIEF DESCRIPTION OF THE DRAWINGS

FIG. 1 is a block diagram of a high output roof-mounted solar power assembly integrated into a vehicle.

DETAILED DESCRIPTION

The output of an array of solar cells is proportional to the amount of solar energy that the cells in an array receive, with maximum exposure of a flat-surfaced solar panel being reached when the light-gathering surface of the panel's cells is perpendicular to the direction of rays of the sun. Considering that the position of the sun in the sky and the direction of the rays change both throughout the day and seasonally, the output of a stationary flat-surfaced panel is optimum only twice a year. Shade, created by both clouds and stationary objects, further decreases the output of such a panel. A flat-surfaced panel mounted on a vehicle may not reach the optimum output at all due to the panel constantly moving along with the vehicle. The vehicle constantly moving in and out of areas of shade further decreases the output of such a panel.

A solar panel can be structured using individual cells that are substantively immune to positional changes due to the motion of a vehicle and are able to provide a constant source of electrical power to recharge the battery and power onboard systems and plugged-in appliances. FIG. 1 is a block diagram of a high output roof-mounted solar power assembly ("solar power assembly") 10 integrated into a vehicle 11. The solar power assembly 10 can be sold separately from the vehicle 11 as an after-market accessory or included as part of the vehicle 11. The solar power assembly 10 includes a roof rack 12 attachable to a roof of a vehicle 11. The roof rack 12 must be attached to the roof of the vehicle 11 mechanically. The roof rack 12 can also be attached to the roof of the vehicle 11 electrically.

A non-flat solar power generator 13, an individual non-flat solar cell capable of producing solar power, is mechanically attached to the roof rack 12. The generator 13 can also be electrically attached to the roof rack 12. In one embodiment, the non-flat solar power generator 13 can be a cylindrical solar cell in a transparent tubular casing, such as described in U.S. Patent Application No. 2011/0000534, published Jan. 6, 2011, to Buller et al., the disclosure of which is incorporated by reference. Other kinds of non-flat solar power generators 13 can be used. Unlike flat-surfaced solar cells or arrays of these cells, the non-flat solar power generators 13 have their light-gathering surface exposed to light coming from multiple directions, making the output of these generators 13 higher due to a smaller dependence on the changing position of the sun or a shade covering a part of a generator 13. Hereinafter, the phrase "planar generation of solar power" refers to the use of flat solar cells to generate solar power; the phrase "nonplanar generation of solar power" refers to the use of non-flat solar cells, including the use of the generator 13, to produce solar power.

More than one generator 13 can be present, with multiple generators being electrically connected into a power generator array. The solar power assembly 10 can further include reflectors (not shown) positioned on the roof rack 12 to reflect sunlight towards at least one of the generators 13. In a further embodiment, one or more flat-surfaced solar power generators, such as flat-surfaced solar cells, can also be attached to the roof rack 12. The solar power output of the flat-surfaced solar cells can be combined with the output of one or more of the non-flat solar power generators 13 to form a hybrid solar power generator array. The solar power assembly can be used for both planar and nonplanar generation of solar power in the embodiment.

The solar power assembly 10 includes circuitry, wiring, and mechanical components necessary to electrically provide the solar power produced by the generator 13 or the array of generators 13 to components of the vehicle 11. In one embodiment, the solar power assembly 10 is intended to directly recharge a vehicle battery 14 and includes circuitry, wiring, and mechanical components necessary to recharge the battery 14 with the solar power. In a further embodiment, the generator 13 can supplement electrical power provided by conventional onboard systems, such as the vehicle's alternator or regenerative power recovery components, and provide the power to the battery 14 or directly to the car's electrical components, such as described in U.S. patent application entitled "Solar-Powered Diesel Engine Heater," Ser. No. 13/928,288, filed, Jun. 26, 2013, pending to Bardy et al., the disclosure of which is incorporated by reference.

A controller 15, which responds to user input, includes the necessary circuitry, wiring, and mechanical components to command the solar power assembly 10. The controller 15 can include, for instance, a button, and other devices for receiving user input, such as switches and dials. Multiple devices for receiving user inputs can be present on the controller 15. The controller 15 can be connected to other components of the solar power assembly 10 either electrically or wirelessly. Other configurations of the controller 15 are possible.

The roof rack 12 can further include a mechanism for moving or repositioning the one or more generators 13 when mounted on the vehicle's 11 roof or other sunlight exposed surfaces of the vehicle 11. The mechanism can be configured to lift, turn, or reorient one or more of the generators 13, either under command of the controller 15 or autonomously.

The solar power assembly 10 can be used to provide solar power to a gasoline-powered vehicle, a diesel-powered vehicle, an electric vehicle, or a hybrid electric vehicle, as well as unpowered vehicles, such as trailers.

While the invention has been particularly shown and described as referenced to the embodiments thereof, those skilled in the art will understand that the foregoing and other changes in form and detail may be made therein without departing from the spirit and scope.

What is claimed:

1. A rack-integrated solar power assembly, comprising:
    at least one nonplanar solar cell that is configured to generate solar power and is further configured to provide the solar power to an electrical energy storage in a vehicle via an electrical connection, wherein the solar power comprises sunlight converted into electrical energy;
    at least one planar solar cell electrically connected with the at least one nonplanar solar cell into an array; and
    a rack shaped to attach to the at least one nonplanar solar cell and to a sunlight-exposed surface of the vehicle.

2. A solar power assembly according to claim 1, further comprising:
    a controller of the at least one nonplanar solar cell.

3. A solar power assembly according to claim 1, further comprising:
    a moving mechanism of the at least one nonplanar solar cell, the moving mechanism comprised in the rack.

4. A solar power assembly according to claim 1, wherein the sunlight-exposed surface comprises the vehicle's roof.

5. A solar power assembly according to claim 1, further comprising:
    at least one reflector for reflection of the sunlight at the at least one nonplanar solar cell.

6. A solar power assembly according to claim 1, the at least one nonplanar solar cell comprising a cylindrical solar cell.

7. A solar power assembly, comprising:
    means for nonplanar generation of solar power, wherein the solar power comprises sunlight converted into electrical energy, the means for the non-planar generation of the solar power configured to provide the solar power to an electrical energy storage in a vehicle via an electrical connection;
    at least one planar solar cell electrically connected with the nonplanar solar power generation means into an array; and
    means for attachment of the nonplanar solar power generation means to a sunlight-exposed surface of the vehicle.

8. A solar power assembly according to claim 7, further comprising:
    a controller of the at least one nonplanar solar power generation means.

9. A solar power assembly according to claim 7, further comprising:
    a moving mechanism of the at least one nonplanar solar power generation means.

10. A solar power assembly according to claim 7, wherein the sunlight-exposed surface comprises the vehicle's roof.

11. A solar power assembly according to claim 8, further comprising:
    at least one reflector for reflection of the sunlight at the at least one nonplanar solar power generation means.

* * * * *